May 31, 1938.   H. W. HEY   2,119,255
GEAR SHIFTING MECHANISM FOR MOTOR VEHICLES
Filed Feb. 20, 1936   4 Sheets-Sheet 2
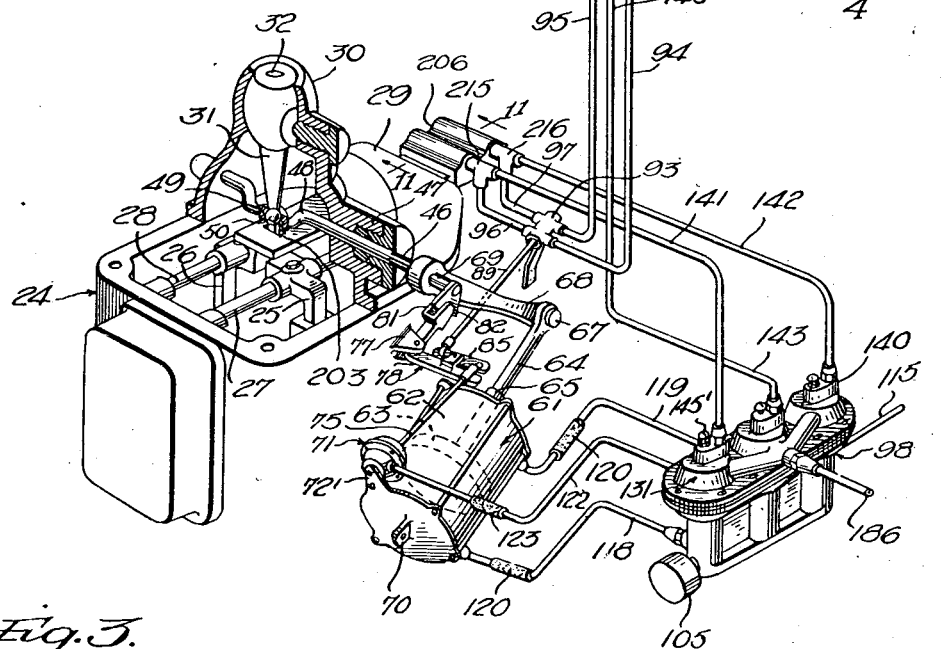
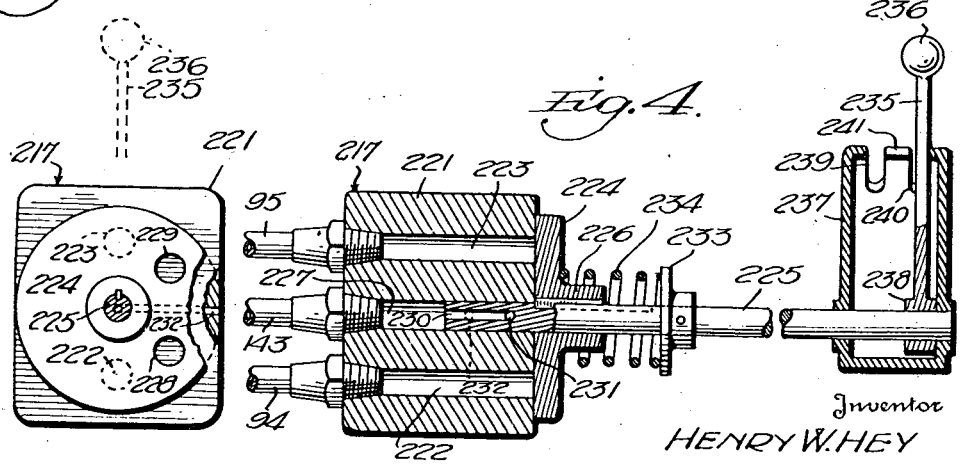
Inventor
HENRY W. HEY

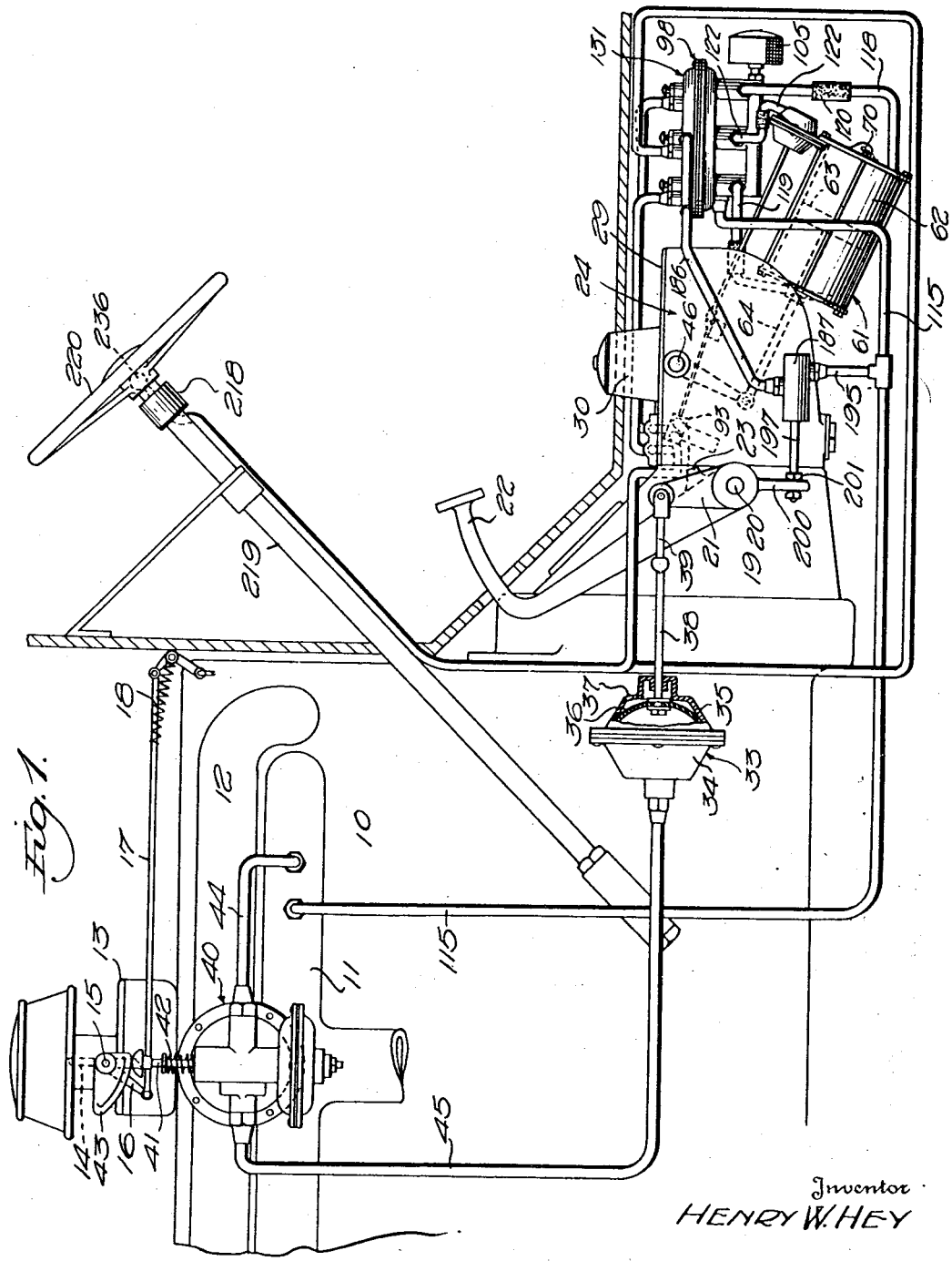

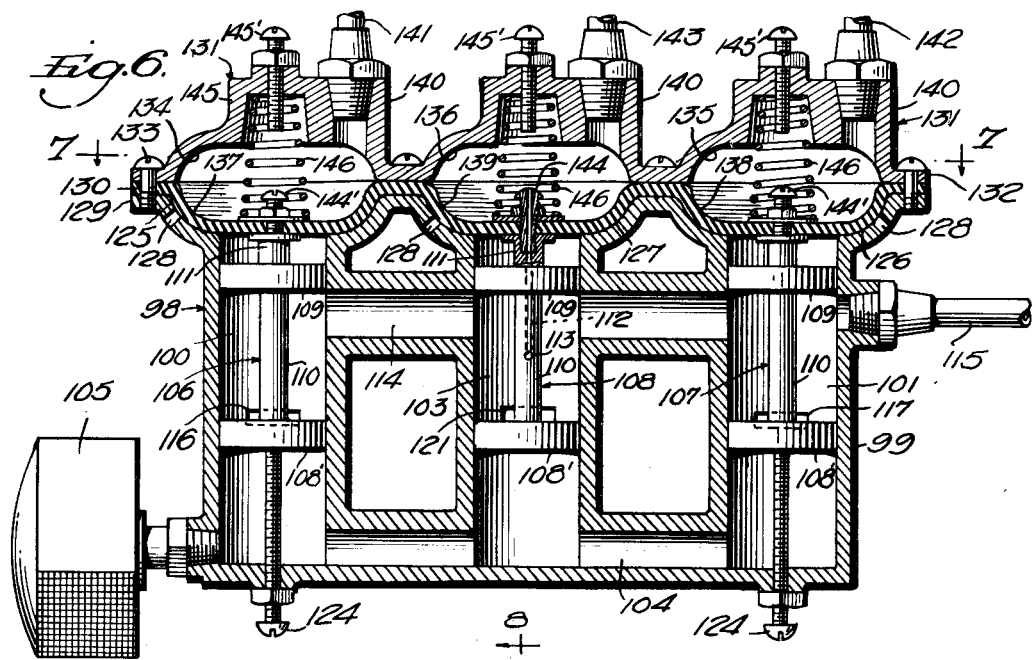
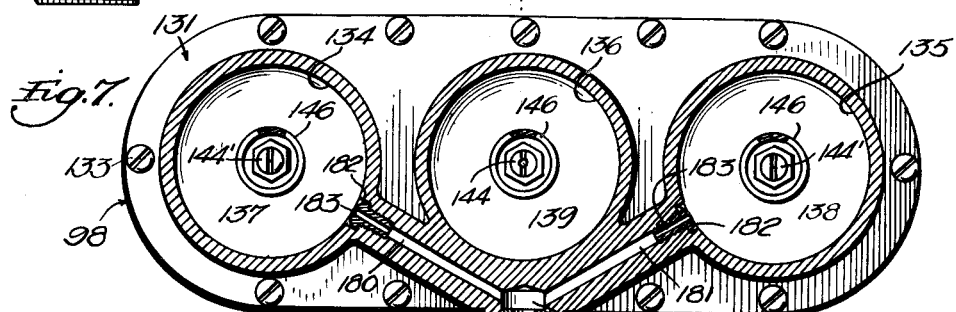
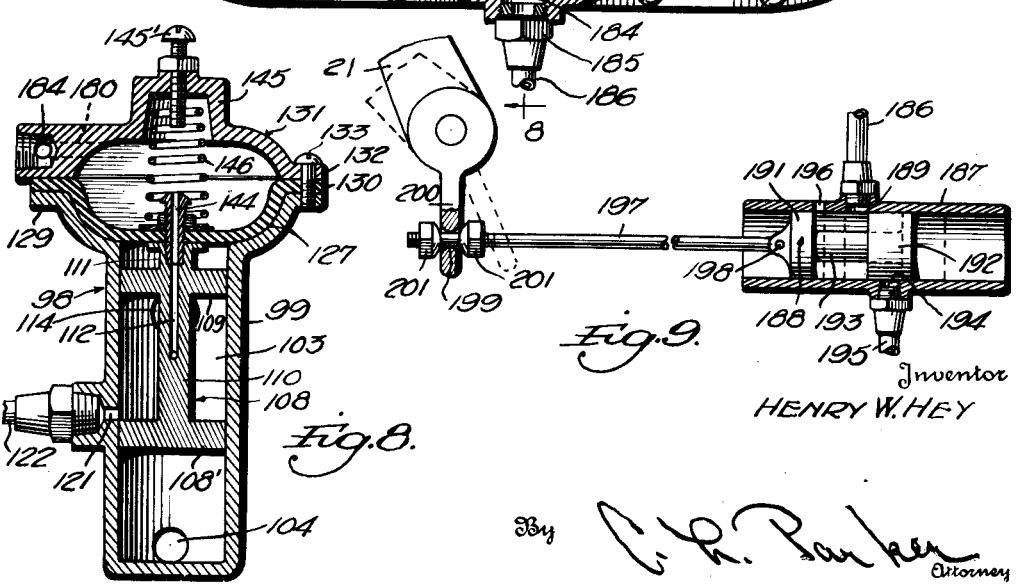

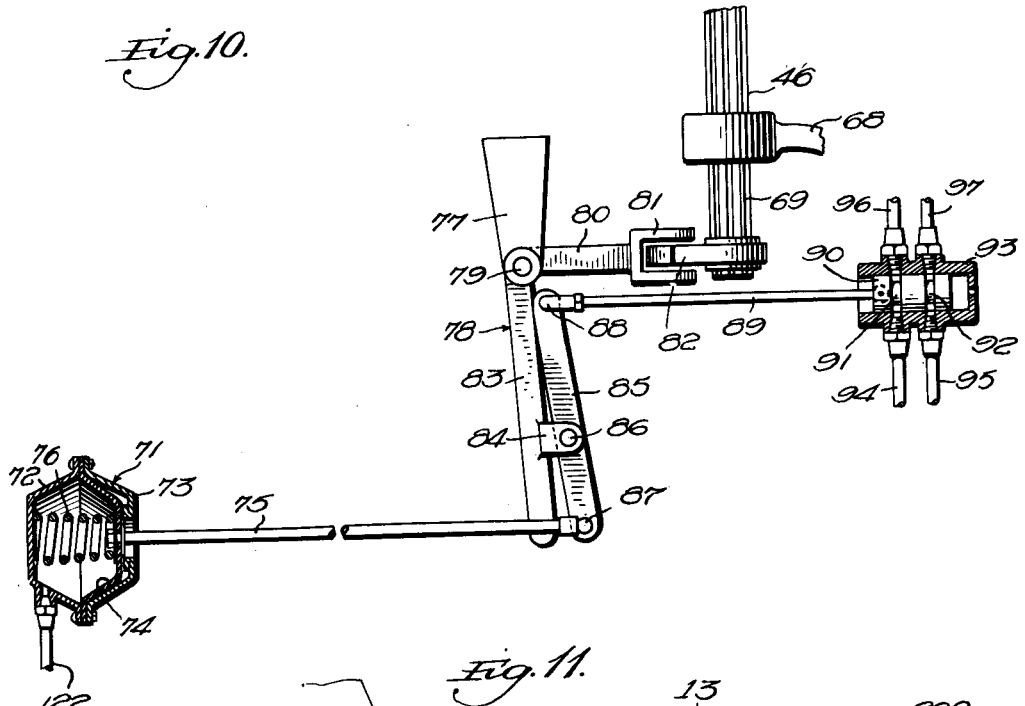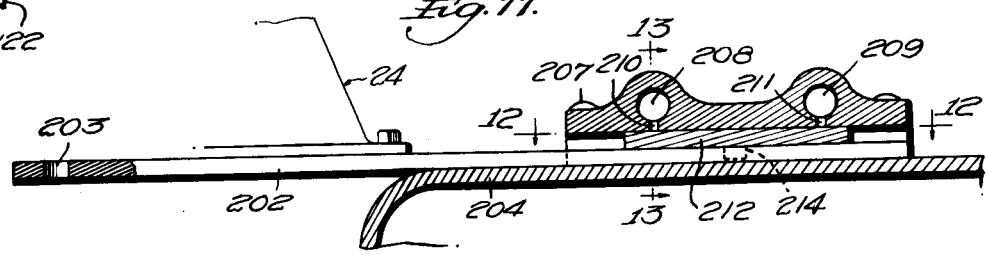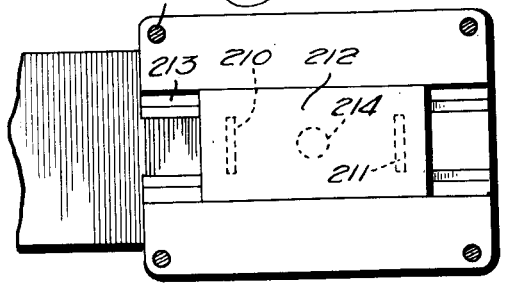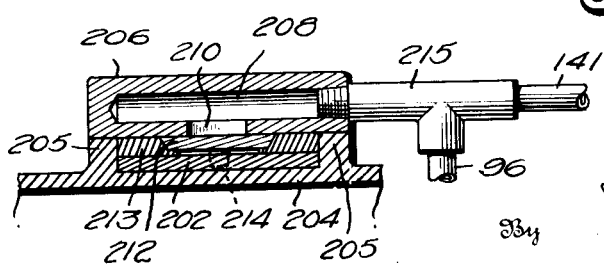

Patented May 31, 1938

2,119,255

UNITED STATES PATENT OFFICE 2,119,255

GEAR SHIFTING MECHANISM FOR MOTOR VEHICLES

Henry W. Hey, Richmond, Va., assignor to Automatic Shifters, Inc., Richmond, Va., a corporation of Virginia Application February 20, 1936, Serial No. 64,948

31 Claims. (Cl. 74—334)

This invention relates to gear shifting mechanisms for motor vehicles.

In the prior patent to Edward G. Hill and Henry W. Hey, No. 2,030,838, granted February 11, 1936, and in the copending applications of Edward G. Hill and Henry W. Hey, Serial Nos. 43,104, filed October 1, 1935 and 61,222, filed January 28, 1936, there have been shown and described gear shifting mechanisms for motor vehicles wherein two shifting motors are employed, one for effecting longitudinal movement of the shifting rods and the other for effecting transverse movement of suitable control means for determining which of the shifting rods shall be operated. The shifting motors are controlled by novel valve means manually controlled to permit the operator to select any gear position.

In application Serial No. 61,222, referred to above, a novel valve structure is associated with the motor which selects the shift rod to be operated, such valve structure being operative for performing two functions. In the first place, it is desirable in a mechanism of this character to permit a gear position to be preselected. In other words, it is desirable that the mechanism permit the operator to move the manual selector between any two gear positions prior to the disengagement of the vehicle clutch, and that the mechanism operate to shift gears in accordance with the position of the manual selector after the clutch has been disengaged. Moreover, it is desirable to provide means for preventing the main shifting motor from moving the gears out of a gear position and then back into such gear position instead of into the position as predetermined by the manual selector.

The valve structure referred to accomplishes the two results described and forms the subject matter of co-pending application Serial No. 61,222. The mechanism disclosed in such application is fully operative for its intended purposes but is capable of being somewhat simplified and rendered more positive in operation under extreme conditions to be referred to.

An important object of the present invention is to provide an improved gear shifting mechanism for permitting any gear position to be preselected prior to the disengagement of the clutch.

A further object is to provide a mechanism of the character referred to which is extremely simple and positive in operation.

A further object is to provide a simple and effective "interlock" which functions under certain conditions to assume control of the main shifting motor to prevent the latter from moving a shift rod out of a given gear position and back into such gear position instead of shifting the gear set into the selected position.

A further object is to provide a mechanism of the character referred to wherein the "interlock" functions in a novel manner in conjunction with the means for transferring the shift from one shift rod to the other.

A further object is to provide novel common means for "interlocking" in the manner referred to and for providing for the preselection of any gear position from any other gear position.

A further object is to provide power means for transferring the shift from one shift rod to the other and for utilizing such power means in a novel manner for providing an interlock immediately upon actuation of the power means and prior to the transferring of the shift from one shift rod to the other to thus insure the transferring operation.

Other objects and advantages of the invention will become apparent during the course of the following description.

In the drawings I have shown one embodiment of the invention. In this showing:

Figure 1 is a side elevation of a portion of a motor vehicle power plant showing the invention applied, Figure 2 is a fragmentary perspective view of a portion of a motor vehicle gear set showing the operating and controlling means therefor together with the piping connections, Figure 3 is a section on line 3—3 of Figure 2, Figure 4 is a similar view on line 4—4 of Figure 2, Figure 5 is a similar view on line 5—5 of Figure 2, Figure 6 is a central vertical longitudinal sectional view through the main control valve mechanism, Figure 7 is a section on line 7—7 of Figure 6, Figure 8 is a similar view on line 8—8 of Figure 7, Figure 9 is a detail vertical sectional view of a lock out showing its connection to the clutch pedal, Figure 10 is a plan view of the transverse shifting means, parts being shown in section, Figure 11 is a sectional view on line 11—11 of Figure 2, Figure 12 is a similar view on line 12—12 of Figure 11, and, Figure 13 is a similar view on line 13—13 of Figure 11.

Referring to Figure 1, the numeral 10 designates a motor vehicle engine having the usual intake manifold 11 and exhaust manifold 12. The intake manifold is provided with the usual carbureter 13 having a butterfly control valve 14 mounted on a shaft 15 operable by an arm 16. Suitable accelerator means is provided for operating the throttle arm 16. Such means includes a rod 17 provided with a return spring 18, and connected in any suitable manner to a conventional accelerator pedal (not shown).

The engine is provided with the usual clutch indicated as a whole by the numeral 19 and including the usual clutch plates (not shown) operable by a rock shaft 20. This shaft is provided with an arm 21 secured thereto, as shown in Figure 1. A clutch pedal 22 has its lower end freely mounted on the shaft 20 and provided with a lug 23 engageable with the arm 21 to actuate the latter upon depression of the clutch pedal.

A gear set 24 is mounted rearwardly of the clutch and may be provided with conventional gears (not shown) shiftable by means of the usual forks 25 and 26 secured to the usual shift rods 27 and 28 respectively. The gear set in Figure 2 is shown looking angularly toward the forward end of the vehicle, and accordingly the shift rod 27 controls first and reverse gears while the shift rod 28 controls second and high gears. The casing of the transmission is provided with the usual cover 29 having an upwardly projecting portion 30 universally supporting a lever 31, corresponding to the lower portion of the usual conventional gear shift lever. It will be apparent that the upper portion of this lever is omitted, but the lever 31 may be provided with a socket 32 in its upper end for the reception of a rod when it is desired to operate the transmission conventionally. The lower end of the lever 31 engages the forks 25 and 26 in the usual manner to effect a change in forward driving ratio or to place the gear set in reverse gear.

It will become apparent that the present apparatus may be used in conjunction with a conventional foot operated clutch, but it readily may be used in connection with an automatic clutch control mechanism, and such mechanism has been generally illustrated in the drawings. Referring to Figure 1, the numeral 33 designates a differential pressure power device including casing sections 34 and 35 having a diaphragm 36 clamped therebetween, and the casing section 35 is vented to the atmosphere as at 37. A rod 38 is connected at its forward end to the diaphragm 36, and has its rear end connected by a cable or similar flexible element 39 to the upper end of the clutch arm 21.

Any suitable form of valve mechanism may be employed for controlling the power device 33, but it is preferred that the valve mechanism described and claimed in the patent to Edward G. Hill, No. 1,964,693, granted June 26, 1934, be employed. It will become apparent that the gear shifting mechanism to be described is not in any sense dependent for its operation on the particular type of control valve mechanism for the power device 33, since any control valve mechanism operative for actuating and deactuating the power device 33 may be employed. The valve mechanism is indicated as a whole by the numeral 40 and is indicated in Figure 1 as being operable by a stem 41 normally urged upwardly by a spring 42 and movable downwardly by a cam 43 secured to the throttle shaft 15.

The valve mechanism 40 is provided with a conduit 44 leading to the intake manifold 11, and is provided with a second conduit 45 leading to the casing section 34. When the valve mechanism and its operating elements are in the position shown in Figure 1, the throttle is opened and the power device 33 is deenergized, whereby the clutch elements are in operative engagement. Upon the closing of the throttle 14, the stem 41 is depressed by the cam 43 to connect the casing section 34 to the intake manifold through conduits 44 and 45.

Motion is transmitted to the shifting lever 31 by means of a shaft 46. This shaft extends transversely of the gear set and is journaled in bearings 47 carried thereby. A crank 48 is carried by the shaft 46 and is provided with a collar 49 engaging a ball 50 formed on the lever 31. The shaft 46 is adapted to rock in its bearings, whereby the collar 49 transmits forward and rearward movement to the lower end of the lever 31 to effect the shifting of the gears, as will be apparent. The shaft 46 is adapted to slide in its bearings to determine the lateral position of the lower end of the lever 31, in the same manner that such lateral movement is effected by a conventional transmission lever in selecting the proper gears.

Referring to Figures 1 and 2, the numeral 61 designates a power device operative for rocking the shaft 46. In the present instance the power device is illustrated as comprising a cylinder 62 in which a piston 63 is reciprocable. A piston rod 64 is connected at one end to the piston 63 and extends through the adjacent end of the cylinder through a suitable bearing 65. The other end of the rod 64 is pivotally connected as at 67 to one end of an arm 68, and the other end of this arm is splined as at 69 to the adjacent end of the shaft 46. Accordingly rocking of the arm 68 is adapted to rock the shaft 46, and at the same time this shaft is slidable through the arm 68 by virtue of the splined connection 69. Obviously the rocking of the arm 68 must be compensated for by movement of the cylinder 62, and for this purpose the cylinder is provided with pivot means 70 supported with respect to any suitable portion of the vehicle. The power means for sliding the shaft 46 to transfer the shifting action between the shift rods 27 and 28 comprises a motor 71 shown as being of the differential pressure type and including casing sections 72 and 73 having a diaphragm 74 clamped therebetween. The casing section 72 is preferably carried by an upstanding ear 72' which may be formed integral with the adjacent head of the cylinder 62. Thus the motors 61 and 71 form, in effect, a unitary power means for effecting the shifting operations. A rod 75 is secured at one end to the diaphragm 74 as shown in Figure 10 and extends through the casing section 73, the latter having a relatively large central opening which affords communication between the atmosphere and the interior of the casing section 73 and permits the rod 75 a substantial degree of flexibility with respect to the motor casing. A spring 76 urges the diaphragm 74 toward the right, as shown in Figure 10.

Supporting ears 77 are preferably formed integral with the transmission housing and pivotally support a bell crank lever indicated as a whole by the numeral 78 as at 79. One arm 80 of the bell crank lever is provided with a fork 81 engaging an arm 82 secured to the shaft 46 and accordingly rocking movement of the bell crank lever slides the shaft 46 to transfer the shift between the shift rods 27 and 28.

The bell crank lever has its other arm 83 provided with ears 84 pivotally supporting a lever 85 as at 86. The lever 85 is preferably arranged in the plane of the lever arm 83 and accordingly its rocking movement about the pivot 86 is limited by contact with the lever arm 83. The free end of the rod 75 is connected by a ball and socket connection 87 with one end of the lever 85 and the other end of this lever has similar connection as at 88 with one end of a valve operating rod 89. The other end of this rod is connected to a valve 90 provided with annular grooves 91 and 92, and the valve is slidable in a housing 93. Fluid pipes 94 and 95 are connected to one side of the housing 93, and when the valve 90 is in the position shown in Figure 10, the grooves 91 and 92 afford communication respectively between the pipes 94 and 95 and similar pipes 96 and 97 also tapped into the valve casing 93. The purpose of the valve mechanism referred to will be described in detail later.

Main control valve mechanism indicated as a whole by the numeral 98 is provided for controlling the operation of the piston 63 and for controlling the connection of the casing section 72 to the atmosphere or to a source of suction such as the intake manifold 11. The main control valve mechanism is illustrated in detail in Figures 6, 7 and 8. This mechanism comprises a preferably cast body 99 having two relatively large valve receiving openings or cylinders 100 and 101 extending downwardly thereinto adjacent the ends of the casing, and a similar valve receiving opening or cylinder 103 is provided substantially centrally of the length of the casing. Each of these valve cylinders communicates at its lower end with a longitudinal passage 104 which in turn communicates with the atmosphere through any suitable type of air cleaner 105 to minimize the entrance of dust or other foreign material into the valve casing.

The valve cylinders 100, 101 and 103 are provided respectively with valves indicated as a whole by the numerals 106, 107 and 108. These valves are identical with each other and only one need be described in detail. Referring to Figures 6 and 8 it will be noted that each of the valves referred to comprises lower and upper heads 108' and 109 connected by a stem 110. This stem extends above the head 109 as indicated by the numeral 111 for a purpose to be described. The stem 110 of the valve 108 is provided with a longitudinal passage 112 extending from the upper extremity of the stem portion 111 to a point between the heads 108' and 109 and communicates with a lateral port 113 opening into the interior of the valve cylinder in which the valve is arranged. A longitudinal passage 114 extends horizontally through the casing and communicates between the three valve cylinders. The end of the passage 114 is connected to a pipe 115 leading to the intake manifold 11.

The valve casing is provided with a pair of ports 116 and 117 communicating respectively with the valve cylinders 100 and 101. These ports communicate respectively with pipes 118 and 119 leading respectively to the lower and upper ends of the cylinder 62, as shown in Figures 1 and 2. Each of these pipes is preferably provided with a flexible section 120 to permit the relatively slight movement of the cylinder 62 with respect to the valve mechanism 98 when the piston 63 operates to swing the arm 68. The valve casing is further provided with a port 121 communicating with a pipe 122 leading to the casing section 72, as shown in Figures 2 and 10. This pipe also may be provided with a flexible section 123 for the same purpose as the flexible section 120.

Each of the main valves is movable upwardly to uncover its associated port 116, 117 or 121 and open such port to the atmosphere through the passage 104, and each valve is similarly movable downwardly to connect its associated port to the source of vacuum through the passage 114. Screws 124 are employed for limiting the downward movement of the valves 106 and 107 to limit communication between the source of partial vacuum and the cylinder 62 through the ports 116 and 117, for a purpose to be described.

The valve casing 99 is provided in its upper end with circular recesses 125, 126 and 127 arranged coaxial with respect to the valves 106, 107 and 108, and each of these pockets is vented to the atmosphere as at 128. To provide for the pockets referred to the top of the valve casing 99 is outwardly flanged as at 129. A flexible sheet 130 is arranged over the flange 129 and corresponds in shape and size thereto. A cap indicated as a whole by the numeral 131 is arranged over the flexible sheet and has an outer flange 132 corresponding in shape and size to the flexible sheet and secured to the flange 129 by screws 133.

The cap 131 is provided with circular recesses 134, 135 and 136 coaxial with the respective recesses 125, 126 and 127. The flexible sheet 130 therefore forms three diaphragms 137, 138 and 139 movable in the pairs of recesses referred to. These diaphragms are secured to the upper ends of the valve stems of the respective valves 106, 107 and 108. The pockets 134, 135 and 136 form chambers each of which communicates with the interior of a boss 140 formed integral with the cap 131. Pipes 141, 142 and 143 are connected to the interiors of the respective bosses 140, and communication between the atmosphere and the pipes referred to is controlled in a manner to be described.

The chamber 136 is in constant communication with the source of partial vacuum through the passage 112. This communication is restricted and may be fixed at any desired rate by means of a screw 144 threaded into the upper end of the valve stem portion 111 and having a small drilled axial passage therethrough. The cap 131 is provided with axial extensions 145 receiving the upper ends of springs 146, the lower ends of these springs urging the respective diaphragms downwardly. Each spring is adapted to move its associated valve to its lower position when its respective vacuum chamber is connected to the atmosphere through one of the pipes 141, 142 or 143. When the diaphragm chamber 136 is closed to the atmosphere, the restricted communication between the vacuum chamber and the source of partial vacuum through passage 112 maintains differential pressure on opposite sides of the diaphragm 139 to maintain the valve 108 in its upper position. The chambers 134 and 135 also have restricted communication with the source of partial vacuum under certain conditions to be described, and the partial vacuum under such conditions is adapted to lift the valves 106 and 107 to their upper positions, provided the pipes 141 and 142 are closed to the atmosphere. The operation referred to will be described in detail later. The upper ends of the stems of the valves 106 and 107 are provided with screws 144', and the screws in the upper ends of the several valve stems are engageable with screws 145' to limit the upward movement of the valves.

Referring to Figure 7, the numerals 180 and 181 designate passages formed in the cap 131 and communicating with the respective chambers 134 and 135 through screws 182 having small drilled axial passages 183 therethrough. These screws are replaceable with screws having different sized openings to govern the degree of communication between the passages 180 and 181 and the respective chambers 134 and 135. The passages 180 and 181 communicate at their adjacent ends with a recess 184 into the outer end of which is tapped a union 185 having a pipe 186 connected thereto.

In Figure 9 of the drawings a lock out valve is illustrated as being controlled by the clutch pedal. This valve comprises a cylindrical casing 187 in which a valve 188 is slidable. The valve casing is provided with a port 189 having the pipe 186 connected thereto. The valve 188 comprises a pair of heads 191 and 192 connected by a stem 193, and the valve normally occupies the solid line position shown in Figure 9. The valve is movable to the dotted line position shown, and in either position, the port 189 communicates with the space between the valve heads. The valve casing is provided with a port 194 connected by a pipe 195 to the vacuum line 115. The valve casing is also provided with an atmospheric port 196 communicating with the space between the valve heads when the valve is in the solid line position and disconnected therefrom when the valve is in the dotted line position.

An operating rod 197 is provided for the valve 188 and is pivotally connected thereto as at 198. The other end of the rod 197 projects through an opening 199 formed in a depending arm 200 preferably integral with the clutch pedal 22. Nuts 201 are threaded on the rod 197 to prevent movement thereof with respect to the arm 200. When the clutch is disengaged the pedal 22 occupies the dotted line position shown in Figure 9, in which case the port 194 communicates with the space between the valve heads 191 and 192 and thus with the port 189. Under such conditions the chambers 134 and 135 will be connected to the intake manifold, the degree of communication being restricted by the orifices 183 of the screws 182. When the clutch is engaged, the pedal 22 is in the solid line position shown in Figure 9, in which case the port 194 will be closed by the valve head 192, thus closing communication between the chambers 134 and 135 and the intake manifold. At the same time the pipe 186 and port 189 will be connected to the atmosphere through port 196.

The transmission housing supports a horizontal slide 202 extending into the housing and provided with an opening 203 through which the lever 31 projects, just below the ball 50. It will be apparent that the opening 203 is of such a length transversely of the slide 202 as to permit lateral movement of the lower end of the shift lever 31 to permit the latter to selectively engage the forks 25 and 26 without transmitting any lateral movement to the slide 202. It will be apparent, however, that this slide is movable longitudinally when the lower end of the shift lever 31 moves forwardly and rearwardly.

The top portion of the transmission housing is indicated by the numeral 204 and forms a plate over which the slide 202 operates. This plate is provided with upstanding flanges 205, and a valve cap 206 is secured against the upper edges of these flanges by screws 207. The cap 206 is provided with a pair of transverse passages 208 and 209 extending through one edge of the valve cap as indicated in Figure 13. These passages are provided with downwardly opening ports 210 and 211 respectively adapted to be controlled by a slide valve 212. The valve is slidable in suitable guides 213 and is provided with a depending pin 214 arranged in a suitable opening in the slide 202 whereby the valve is operated thereby. The valve 212 is somewhat longer than the distance between the ports 210 and 211, as indicated in Figures 11 and 12.

It will become apparent that the valve 212 is operative for stopping the shift lever 31 in neutral position, and it is also operative when the motor piston 63 reaches each end of its stroke for stopping the piston with equalized vacuum on both sides thereof, which operation prepares the piston for movement in the other direction. This action is accomplished by controlling the exhausting of air from the diaphragm chambers 134 and 135. The ends of the two passages 208 and 209 are connected respectively to T's 215 and 216 and the branches of these T's are connected respectively to the pipes 96 and 97 leading to the valve casing 93. The lower ends of the runs of the T's 215 and 216 are connected to the pipes 141 and 142.

The pipes 94 and 95 and the pipe 143 leading from the diaphragm chamber 136 are controlled by a manually operable selector valve indicated as a whole by the numeral 217 shown in Figure 2 and illustrated in detail in Figures 3 and 4. The manual selector is preferably located adjacent the steering wheel and may be contained within a suitable housing 218 (Figure 1) secured to the steering column 219 having the usual steering wheel 220 at its upper end. The housing 218 extends laterally from the steering post, as will be apparent, but it is not essential that any particular type of housing be employed.

Referring to Figures 2, 3 and 4, the numeral 221 designates a valve housing contained within the housing 218 and provided with a pair of passages 222 and 223 extending therethrough. These passages are connected respectively to the pipes 94 and 95 as shown in Figure 4. A valve 224 seats against the end of the valve casing 221 remote from the pipes 94 and 95 and is splined on a shaft 225 as at 226. The shaft extends through an opening 227 parallel to the openings 222 and 223 and this opening has its end communicating with the pipe 143. The valve 224 is provided with a pair of openings 228 and 229 adapted to respectively open the passages 222 and 223 to the atmosphere when the valve is rocked from the position shown in Figure 3. The shaft 225 is provided with an axial passage 230 in its inner end, and the inner end of the passage 230 is connected to a lateral port 231. The valve casing 221 is provided with a lateral port 232 extending from the passage 227 to the atmosphere and adapted to communicate with the lateral passage 231 when the shaft 225 is moved axially toward the left as viewed in Figure 4 in a manner to be described.

A collar 233 is secured to the shaft 225 and a spring 234 is arranged between this collar and the valve 224 to maintain the latter on its seat and to urge the shaft 225 toward the right, as viewed in Figure 4. The outer end of this shaft carries an operating lever 235 terminating at its upper end in a knob 236 to facilitate operation of the lever. The lever 235 is contained within a segmental housing 237 and the lever is secured to the shaft 225 by a hub 238 which engages one of the inner faces of the housing 237 to limit the sliding movement of the shaft to the position shown in Figure 4.

The segmental housing 237 is provided with a pair of forwardly and rearwardly extending parallel slots 239 and 240 connected by a transverse slot 241. The four ends of the two slots 239 and 240 represent and correspond in position to the four positions of a conventional gear shift lever. When the lever 235 is arranged at any point centrally of the length of these slots the gear set will be in neutral position, as will become apparent, and one edge of the slot 240 is provided with a notch 242 to receive the lever 235 to hold it in neutral position when moved to such position. It will be apparent that the spring 234 biases the lever 235 toward the slot 240, representing the second and high gear side of the gear set.

The operation of the apparatus is as follows:

While it is preferred that an efficient form of clutch control mechanism be employed, such as that shown in the prior patent to Edward G. Hill, No. 1,964,693, the use of a clutch control mechanism is not necessary since the clutch may be operated by the foot of the operator. Assuming that a clutch control mechanism of the character referred to is employed, the high point of the cam 43 will depress the stem 41 when the throttle 14 is in idling position, in which case the valve mechanism 40 will connect the clutch motor 33 to the intake manifold to effect declutching. As the accelerator pedal is depressed to open the throttle, the high point of the cam 43 will move progressively away from the upper end of the stem 41 thus releasing the latter for progressive upward movement which controls the return movement of the clutch into operative engagement in accordance with the disclosure of the patent referred to. When the motor 33 disengages the clutch the arm 21 will move to the dotted line position shown in Figure 9 connecting the pipes 186 and 195, thus connecting the valve chambers 134 and 135 (Figures 6 and 7) to the intake manifold. Whether this operation will result in generating differential pressure on opposite sides of the diaphragms 137 and 138 will depend upon the position of the manual selector lever 235, as will become apparent. When the clutch is in operative engagement, the arm 21 will be in the solid line position shown in Figure 9, and in the position shown in Figure 1, in which case the pipe 186 will communicate with the atmosphere through port 196, and the chambers 134 and 135 will thus communicate with the atmosphere whereby the associated springs 146 will hold the valves 106 and 107 in their lowermost positions, as shown in Figure 6. As will become apparent, the diaphragms 137 and 138 and their associated valves will remain in their lowermost positions regardless of any other control means.

The operation of the invention referred to constitutes a highly important feature of the mechanism. It will be apparent that when the clutch is in engagement both valves 106 and 107 will remain in their lowermost positions and the ports 116 and 117 will be in communication with the vacuum passage 114 and hence with the intake manifold. Since the ports 116 and 117 communicate with opposite ends of the shift motor cylinder 62, it will be apparent that equalized partial vacuum will exist on opposite sides of the motor piston, thus "vacuum suspending" this piston. Thus, assuming that the gear set is in high gear with the vehicle traveling under normal conditions, the gear set will remain in high gear. The "vacuum suspension" of the piston does not create any tendency of the piston to move out of its gear position, but prepares it for extremely rapid movement when another gear selection is made, as will become apparent.

Assuming, as previously stated, that the vehicle is traveling under normal conditions in high gear and the driver desires to shift into second gear, he may release his foot from the accelerator pedal to effect declutching. This operation takes place in the manner stated, through the clutch control mechanism, and after the clutch is disengaged, the lever 235 may be shifted from the rear end of the slot 240 to the forward end thereof. Upon disengagement of the clutch the pipes 186 and 195 (Figure 9) will have been connected to each other to afford communication between the vacuum chambers 134 and 135 and the intake manifold in the manner previously stated. The position of the motor piston 63 will not be affected by this operation since it will have been vacuum suspended in the high gear position, as will become apparent.

The movement of the selector lever 235 to the second gear position rotates the valve 224 to open the passage 222 to the atmosphere through the valve port 228. The passage 222 communicates with the pipe 94 which in turn communicates with the pipe 96 through the valve slot 91 (Figure 10) and the pipe 96 communicates through the T 215 and pipe 141 with the vacuum chamber 134.

Since the gear set will have been in high gear at the starting of the operation referred to, the slide valve 212 will be in a position toward the right of the position shown in Figure 11 maintaining the port 211 closed while the port 210 will be open. The latter port communicates with the atmosphere through the adjacent end of the valve guide, and since the passage 208 communicates with the pipe 141, the diaphragm chamber 134 will have been opened to the atmosphere prior to the movement of the selector valve and independently of the valve 186. The operation of the selector valve therefore will not affect the previous condition of the diaphragm chamber 134 and since the latter will have been already in communication with the atmosphere, the diaphragm 137 will remain in its lowermost position. As previously stated, the port 211 (Figure 11) will have been disconnected from the atmosphere and the movement of the selector valve 224 to second gear position closes the passage 223 to the atmosphere. Thus the pipe 142 will be closed to the atmosphere by the slide valve 212, selector valve 224 and clutch operated valve 188, and hence the diaphragm chamber 135 will be closed to the atmosphere.

The movement of the selector valve to second gear position, therefore, results for the time being only in disconnecting the chamber 135 from the atmosphere, and since the clutch is disengaged, air will be exhausted from the chamber 135 through pipes 186, 195 and 115, thus establishing differential pressure on opposite sides of the diaphragm 138 to elevate the valve 107. This operation disconnects the port 117 (Figure 6) from the vacuum pipe 115 and connects it to the atmosphere through passage 104. The port 117 communicates with the upper end of the motor cylinder 62 and thus air is admitted into such end of the cylinder while a partial vacuum is retained in the lower end of the cylinder. The piston 63 will thus immediately and rapidly move downwardly and rearwardly to cause the shift fork 26 to place the gear set in second gear position.

The admission of air into the upper end of the cylinder 62 breaks the "vacuum suspension" of the piston 63 and the latter moves very rapidly to impart a corresponding movement of the shift fork 26 out of high gear position. By limiting the downward movement of the valve 106 by the associated screw 124, communication between the lower end of the cylinder 62 and the intake manifold is limited by the partial uncovering of the port 116. The result of this operation is to restrict the exhausting of air from the lower end of the cylinder 62, thus providing an extremely rapid movement of the shift fork out of high gear position and a somewhat slower movement into low gear position as is desired. This operation also is true of forward and upward movement of the piston 63 by virtue of the use of the screw 124 associated with the valve 107, and this operation is fully disclosed in the prior patent to Edward G. Hill and Henry W. Hey, No. 2,030,838, referred to above.

As the gears are shifted from high toward second gear position the slide valve 212 moves toward the left as viewed in Figure 11 and when neutral position is reached the slide valve will close the port 210. This fact does not affect the pressure in the chamber 134, however, since this chamber is open to the atmosphere through the selector valve port 228, and the valve 106 will remain in its lowermost position. However, when second gear position is reached the slide valve 212 will uncover the port 211, thus admitting air into the passage 209 and thence through pipe 142 to the vacuum chamber 135. Regardless of the fact that the selector valve passage 222 is closed to the atmosphere, therefore, the chamber 135 will be opened to the atmosphere, thus permitting the associated spring 146 to move the valve 107 downwardly to uncover the port 117 to the source of partial vacuum. This port communicates with the upper end of the cylinder 62 and whereas atmospheric pressure is present in such end of the cylinder to move the piston to its lowermost position, the upper end of the cylinder will be connected to the source of vacuum when the piston reaches the lower end of the cylinder. The latter end of the cylinder remains connected to the source of vacuum through port 116, and thus the piston 63 will be "vacuum suspended" in its lowermost position with the gear set in second gear.

The shifting operation from second gear back into high gear will be identical with the operation previously described and may be accomplished by movement of the selector lever 235 to the rear end of the slot 240. The operation which then takes place will be apparent from the foregoing description and need not be referred to in detail. The passage 223 will be open while the passage 222 will be closed, and since the slide valve 212 will be moved to the left from the position shown in Figure 11, the diaphragm 138 and valve 107 will remain in their lower positions while the valve 106 will move upwardly. This operation is exactly the same as the operation previously described except that the valve 106 instead of the valve 107 will be moved upwardly. The lower end of the cylinder 62 thus will be connected to the atmosphere and the piston 63 will move upwardly and forwardly until the high gear position is reached, whereupon the slide valve 212 will open the port 210 and release the valve 106 for downward movement. The piston 63 then will be "vacuum suspended" in high gear position.

While the shifting of the gears in accordance with the foregoing operation has been described as taking place upon the operation of the manual selector after the clutch has been disengaged, the shift between second and high gears may be "preselected". In other words, the operator may move the selector lever at any time, and shifting will not take place until clutch disengagement has been effected. As previously stated, the diaphragm chambers 134 and 135 are connected to the atmosphere at all times when the clutch is in engagement, due to the operation of the valve mechanism shown in Figure 9, and at such time, the valves 106 and 107 will occupy their lowermost positions. These valves therefore cannot be affected by operation of the manual selector. Upon disengagement of the clutch, however, the chambers 134 and 135 will be connected to the intake manifold in the manner previously described, whereupon the valves 106 and 107 become subject to control by the manual selector and the slide valve 212.

Assuming that the vehicle is traveling in second or high gear and it is desired to stop the vehicle and place the gear shift in neutral position, such position of the gear shift may be effected merely by moving the selector lever 235 to neutral position in engagement with the notch 242. When this is done, both of the selector valve passages 222 and 223 will be closed by the valve 224. Since the gear set will be in a gear position, one of the ports 210 or 211 will be open to the atmosphere while the other will be closed, and accordingly one of the valves 106 or 107 will be in its upper position while the other will be in its lower position. It follows, therefore, that one end of the motor cylinder 62 will be connected to the atmosphere and the other end to the source of vacuum, depending upon the position of the gears and the position of the piston.

If the vehicle has been traveling in high gear the piston 63 will be in its upper position, in which case air will be admitted to the upper end of the cylinder under the conditions described and the piston will move out of high gear position until it reaches a position centrally of the length of the selector, at which time the gears will be in neutral position. At such point the slide valve 212 will reach the position shown in Figure 11 thus closing the port which was previously open. Since both ports 210 and 211 will thus be closed, and since both of the selector valve passages 222 and 223 will have been closed by the valve 224, both valves 106 and 107 will be in their upper positions when the neutral position of the gear set is reached, both chambers 134 and 135 being closed to the atmosphere whereby differential pressure will be built up on opposite sides of the diaphragms 137 and 138. Thus atmospheric pressure will be present in both ends of the cylinder 62 and the piston 63 will be in neutral position.

Assuming that the operator now desires to shift into a gear position controlled by the shift rod 27, for example, the low gear position, it merely is necessary to move the selector lever 235 into the rear end of the slot 239. It will be first assumed that the gear set is in neutral position with the selector lever in the position shown in Figure 5. Upon transverse movement through the slot 235, the shaft 225 will be moved to the left as viewed in Figure 4 until the port 231 registers with the port 232. This operation opens the pipe 143 to the atmosphere and establishes atmospheric pressure in the diaphragm chamber 136 (Figure 6). The chamber referred to is normally connected to the intake manifold through the passage 112 in the valve stem, and thus differential pressure normally holds the diaphragm 139 in its upper position. When the valve 108 is in such normal position, the port 121 communicates with the atmosphere through passage 104, and thus atmospheric pressure is present in the motor casing section 72 (Figure 10).

However, when air is admitted into the chamber 136 through the cylinder valve ports 231 and 232, the valve 108 drops to disconnect the port 121 from the atmosphere and connect it to the source of vacuum through passage 114. The casing section 72 thus will be connected to a source of vacuum and the diaphragm 73 will move toward the left as viewed in Figure 10 to transfer the shift from the rod 28 to the rod 27. Initial movement of the diaphragm 74 and rod 75 rocks the lever 85 to move the valve 90, and the function of this valve will be referred to later. After the lever 85 has been rocked to take up the play between the outer end of this lever and the free end of the lever 83, motion will be transmitted to the latter to rock it in a clockwise direction as viewed in Figure 10, thus sliding the shaft 46 longitudinally and to the right as viewed in Figure 2 to transfer the shift to the shift rod 27.

If the operator then moves the selector lever 235 rearwardly into low gear position, the piston 63 will move upwardly, thus placing the gear set in low gear. It will be apparent that the selector valve 224, under such conditions, will effect identically the same operation of the control valve mechanism and the motor 61 as in placing the gear set in high gear, and the description of such operation need not be repeated. If the operator shifts from neutral position into reverse gear, the shaft 46 will be moved longitudinally in the manner just described, whereupon the motor 61 will operate in the same manner as when placing the gear set in second gear, it being apparent that such operation is carried out by moving the selector lever to the forward end of the slot 239.

The operation of the valve 90 shown in Figure 10 provides two highly desirable and important results. In the first place, such mechanism operates to permit preselection between first and high gears and between reverse and second gears, and in the second place it operates as an "interlock" to prevent the piston 63 from moving the gears out of one gear position and then back into the same position instead of positively shifting into some other selected position. In connection with the first named function, attention is invited to the fact that preselection may be practiced without the valve 90 between two gear positions represented by a forward position of the selector lever 235 and a rearward position thereof. For example, the operator may preselect between second and high gears; between first and reverse gears; between reverse and high gears or between first and second gears. Without the valve 90, preselection cannot be practiced between first and high gears or between reverse and second gears for the reason that when preselection is made under such conditions, the valve 224 occupies the same position for both of the gear positions.

For example, if an operator should preselect between first and high gears, the control valve mechanism would merely hold the piston in the same end of the cylinder instead of moving it to its central position, effecting the necessary cross over from the shift rod 27 to the shift rod 28, and then moving the piston 63 back to its original position. The function of the valve 90, under such conditions, is to assume the controlling of the main valve mechanism until the piston 63 has been moved to neutral position and the cross over has been effected, after which the controlling of the main valve mechanism is returned to the selector lever.

Many drivers of motor vehicles make little use of second gear and shift directly from low to high gear. Assuming that the vehicle is traveling in low gear with the selector lever 235 arranged in the rear end of the slot 239, the motor 71 (Figure 10) will be energized in the manner previously described and the lever 83 will be rocked in a counter-clockwise direction from the position shown in Figure 10. The lever 85 will be reversed with respect to the position shown, the lower end of this lever as viewed in Figure 10 being in contact with the lever 83. Both of the valve ports 91 and 92, however, will be held in communication with their respective pairs of pipes 94 and 96, and 95 and 97. It is true that for the reason that while the lever 85 is reversed from the position shown in Figure 10 with the upper end of this lever moved relatively toward the right, this movement is compensated for by the fact that the lever 83 will have been moved toward the left.

If the operator desires to practice preselection by moving the lever 235 from low to high gear position before clutch disengagement takes place, the valve 224 will be rotated from the neutral position shown in Figure 3 in a counter-clockwise direction to register the opening 229 with the passage 223, the position of the valve 224 being the same for low and high gears. The movement of the selector lever 235, however, includes the transverse movement of the lever through the slot 241, which action disconnects the ports 231 and 232 through the longitudinal movement of the shaft 225. The pipe 143 and the diaphragm chamber 136 thus will be disconnected from the atmosphere and differential pressure will be built up on opposite sides of the diaphragm 139, by means of the passage 112, to move the valve 108 upwardly. This action connects the motor casing 72 to the atmosphere through pipe 122, port 121 (Figures 6 and 8) and atmospheric passage 104. Pressure will be equalized on opposite sides of the diaphragm 74 and thus spring 76 will move the rod 75 toward the right as viewed in Figure 10.

It will be recalled that in the low gear position the levers 83 and 85 will be reversed from the position shown in Figure 10, and initial movement of the rod 75 toward the right as indicated above initially rocks the lever 85 in a counter-clockwise direction until the upper end of the lever 85 contacts with the lever 83. This operation moves the valve passages 91 and 92 out of registration with their respective pipes and thus disconnects the pipes 141 and 142 from the selector valve mechanism. Obviously this operation is identical in result with the moving of the selector valve to neutral position to close the passages 222 and 223 to the atmosphere.

Under such conditions the function of the valve 90 is to assume control of the main valves 106 and 107, thus preventing these valves from being affected by the position of the selector lever. Since the clutch is still in engagement, the valve 188 (Figure 9) will be in the solid line position shown connecting the pipe 186 to the atmosphere, hence the valves 106 and 107 will be in their lower positions and cannot move from such position until the clutch is disengaged. When the rod 75 (Figure 10) rocks the lever 85 in the manner previously described the spring 76, after play has been taken up between the levers 85 and 83, tends to rotate the bell crank lever 78 in a counter-clockwise direction, but such operation cannot take place since the shaft 46 obviously is incapable of axial sliding movement while the vehicle is in low gear. If the operator preselects high gear, therefore, no operation takes place except for the sliding of the valve 90, and for the time being, this valve has no function.

If the clutch is now disengaged in the manner previously stated, the valve 188 will move to the dotted line position shown in Figure 9 to connect the diaphragm chambers 134 and 135 to the source of vacuum, whereupon the valves 106 and 107 will be controlled in accordance with the positions of the valves 90 (Figure 10) and 212 (Figure 11). The valve 90 prevents the selector valve mechanism from connecting either of the chambers 134 or 135 to the atmosphere. However, since the gear set is in low gear, the port 210 will be uncovered by the slide valve 212 and accordingly air will be admitted through the pipe 141 into the diaphragm chamber 134. Therefore, the restricted communication between the chamber 134 and the source of vacuum through the passage 180 (Figure 7) will not affect the diaphragm 137 and the valve 106 will remain in its lower position to retain the connection between the lower end of the cylinder 62 and the source of vacuum through the port 116.

Since the diaphragm chamber 135 is closed to the atmosphere by valves 90 and 212, however, the diaphragm 138 and its valve 107 will move upwardly, thus connecting the upper end of the cylinder 62 to the atmosphere. The piston 63 will then immediately move out of its upper position until it reaches its central or neutral position, at which point the slide valve 212 will assume the position shown in Figure 11. The diaphragm chamber 134 then will be disconnected from the atmosphere by valves 90 and 212, and differential pressure will be built up on opposite sides of the diaphragm 137 to lift the valve 106 to its upper position, corresponding to the position of the valve 107, whereupon the piston 63 will stop in its central position with atmospheric pressure present on both sides of the piston.

It will be recalled that the spring 76 will be exerting a pressure tending to rotate the bell crank lever 78 in a counter-clockwise direction, and when the neutral position of the parts referred to is reached, the shaft 46 will be released for axial sliding movement and will be moved by the lever 78, thus transferring the shift from the shift rod 27 to the rod 28. Referring to Figure 10 it will be noted that the previous movement of the valve 90 has been toward the left and since the lever end 83 moves to the right to effect the cross over, the valve passages 91 and 92 will return to positions in alinement with their respective pairs of pipes. Under such conditions the controlling of the valves 106 and 107 will be returned to the selector valve device and the motor 61 will operate as determined by the position of the selector lever. Since this lever will have been previously placed in high gear position, the piston 63 will again move to the upper end of the cylinder 62 and the gear set will be placed in high gear position.

Preselection may be accomplished in the same manner from high gear to first gear, if desired, the operation being the same as that previously described except that the movement of the parts is reversed. Movement of the selector lever to the low and reverse gear slot 239 opens communication between ports 231 and 232 to operate the valve 108 and energize the motor 71. Initial movement of the rod 75 toward the left as viewed in Figure 10, rocks the lever 85 in a clockwise direction to close the valve 90 and tends to transmit movement to the bell crank lever 78. The closing of the valve 90 takes away the controlling of the main valves 106 and 107 from the selector valve to cause the shift to move to neutral position, whereupon the lever 78 will be rotated in a clockwise direction to effect the cross over. Under such conditions the movement of the lever 83 is to the left and restores the open position of the valve 90 when neutral position is reached and the cross over takes place, after which the gears will move to low gear position as predetermined by the position of the selector lever. Similar operations take place when preselecting between second and reverse gears, as will be apparent.

The valve 90, so far as preselection is concerned, is of importance only when shifting between two forward positions or between two rear positions. As previously stated, preselection can take place between either rear position and either forward position since in the latter case the piston moves from one end of the cylinder to the other instead of moving from one end of the cylinder to neutral position and then back to the same end of the cylinder. When preselection is made between first and third gears, the piston moves from the upper end of the cylinder 62 to the lower end thereof and intermediate its length of travel the cross over takes place. The valve 90, however, is highly important for rendering the mechanism completely preselective, that is, preselective from any gear position to any other gear position.

In some mechanisms which have been developed for shifting the gears of motor vehicles it has been found that when selection is made, either before or after clutch disengagement, between two forward positions or between two rear positions, it is possible for the actuating piston to move out of its initial position and then back into the same position without having moved to neutral position to permit the cross over action to take place. With such mechanisms, therefore, it has been found desirable to provide what is known as an "interlock" to prevent such improper operation. With the present apparatus the valve 90 functions not only to provide complete preselection, but it operates, without the addition of any other parts, as an effective interlock.

As previously stated, the valves 106 and 107 determine the movement of the piston 63 to effect a forward and rearward shifting movement, and this is true regardless of which of the shift rods 27 or 28 is being operated. Accordingly when the selector lever is moved from low to high gear position, or from reverse to second gear position, the selector valves are set to move the piston 63 to the position already occupied. However, the controlling of the valves 106 and 107 is assumed by the valve 90 when the selector lever is operated to effect movement between two positions at opposite sides of the gear set. This does not affect the operation when moving between two positions forwardly and rearwardly of the gear set but is of great importance when moving between two positions at the same end of the gear set.

Assuming that the vehicle is traveling in low gear and the operator preselects high gear, the operation previously described under such conditions takes place. The movement of the selector lever 235 from the slot 239 transversely across neutral position immediately deenergizes the transverse shifting motor 71 to release the spring 76 to perform its intended functions. The immediate function of this spring is to move the valve 90 to disconnect the grooves 91 and 92 from their respective pipes, and the selector valve 224 is immediately rendered inoperative. This valve therefore can have no effect on the piston 63, and the latter cannot possibly move out of the low gear position and then back into such position before moving to neutral to permit the cross over to take place. Regardless of any gear position in which the gear set may be arranged, the closing of the valve 90 definitely causes the gear set to move to neutral position. The reason for this is that the closing of the valve 90 blocks off both pipes 94 and 95 to the atmosphere, in which case one of the diaphragm chambers 134 or 135 will be opened to the atmosphere only through its associated slide valve port 210 or 211, depending upon the gear position in which the gear set is arranged. Therefore, the gear set is forced to move to neutral position at which point the cross over must take place before the valve 90 is restored to normal position in order to permit the movement of the piston 63 to take place in accordance with the position of the selector valve.

In the case of a shift from low to high gear, the shift must be made first to neutral position whereupon the spring 76 (Figure 10) forces the cross over to take place to the high gear side of the gear set before the valve 90 can restore the controlling of the piston 63 to the selector valve, whereupon this valve effects the shift into high gear. Conversely, if the shift is to be made from high to low gear, the cross over motor 71 is energized and immediately closes the valve 90, whereupon the gear set moves to neutral and the cross over takes place, whereupon the valve 90 again opens to restore the controlling of the valves 106 and 107 to the selector valve. As previously stated, the closing of the pipes 94 and 95 to the atmosphere insures movement of the gear set to neutral position, and accordingly the operations described will take place when preselection is made between reverse and second gears, the immediate function of the cross over motor 71 being to close the valve 90 to insure movement to neutral position.

Accordingly it will be apparent that the operation of the valve 90 in combination with the other elements of the apparatus provides complete preselection and at the same time operates as an "interlock" without the addition of any separate mechanism for this purpose. While the operation of the valve 90 as an "interlock" has been described particularly in connection with the preselection of gear positions, it will be apparent that it functions in identically the same manner if the selector lever 235 is not moved until after the clutch is disengaged. In other words, if the lever 235 is moved between low and high gears after the clutch is disengaged, obviously the valve 224 cannot be returned to the same position it occupied for low gear until after the lever 235 has entered the slot 240 by moving transversely through the slot 241. Accordingly the immediate functioning of the cross over motor to close the valve 90 prevents any inaccurate operation of the apparatus. However, the operation of all of the parts of the mechanism has been found to be so extremely rapid that in actual practice the gear set will reach neutral position and cross over before the operator can move the manual selector lever into high gear position after leaving the low gear position. It will be apparent that the same is true when the selector lever is moved, after clutch disengagement, from high to low gear or between reverse and second gears.

In the copending application of Edward G. Hill and Henry W. Hey, Serial No. 61,222, previously referred to, a valve mechanism is provided for performing the functions of the valve 90 and associated elements, the theory of operation being the same as in the present case. However, the present construction is a distinct improvement over the structure of the copending application referred to for several reasons. In the first place, the valve mechanism of the copending application includes two telescoping valves axially slidable in a valve casing, one of the valves being operated by the cross over motor and the other valve being operated by differential fluid pressure acting on the ends of the valve itself. The latter valve is not as positive in operation as the present construction if the valve is made relatively small, due to the restricted areas of the ends of the valve which must be acted upon by differential pressure to effect movement of the valve. In the present construction, a simpler arrangement is employed since only one valve is necessary, namely, the valve 90, and the operation of this valve does not depend for its movement upon the generation of differential pressure acting on limited areas. It is desirable to provide a highly positive operating means for the valve mechanism referred to in view of the possibility of the valve action becoming sluggish due to the congealing of lubricating oil and other causes. While the valve mechanism of the copending application referred to is fully and accurately operative, the present construction is an improvement thereover for the reasons stated.

In the copending application referred to, it is also required that wholly independent motors be provided for effecting the longitudinal and transverse shifting operations. As will be apparent from Figure 2 of the drawings of the present application, both motors are mounted at one side of the transmission as a single power unit, and the piping connections are greatly simplified by eliminating the necessity for extending such connections to both sides of the transmission as is necessary in the copending application referred to.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A gear shifting mechanism for a motor vehicle having a transmission provided with shifting means movable to control the transmission ratio, comprising power mechanism connected to operate said shifting means, control mechanism connected to control the operation of said power mechanism, and auxiliary control means connected to control said power mechanism in conjunction with said control mechanism, said auxiliary control mechanism comprising a valve device having a single movable member which is operable by said power mechanism for rendering a portion of said control mechanism ineffective under predetermined conditions.

2. A gear shifting mechanism for a motor vehicle having a transmission provided with shifting means movable to control the transmission ratio, comprising power mechanism connected to operate said shifting means, control mechanism connected to control the operation of said power mechanism including a manual selector, and auxiliary control means connected to control said power means comprising a valve device having a single movable member which is operable by said power mechanism for rendering said manual selector ineffective under predetermined conditions.

3. A gear shifting mechanism for a motor vehicle having a transmission provided with shifting means movable to control the transmission ratio, comprising differential pressure power means connected to operate said shifting means, control valve mechanism connected to control the operation of said power means, and an auxiliary control valve device having a single member which is operable by said power means for rendering a portion of said control valve mechanism ineffective under predetermined conditions.

4. A gear shifting mechanism for a motor vehicle having a transmission provided with shifting means movable to control the transmission ratio, comprising differential pressure power means connected to operate said shifting means, control valve mechanism connected to control the operation of said power means including a manual selector valve device, and an auxiliary control valve device having a single member which is operable by said power means for rendering said selector valve device ineffective under predetermined conditions.

5. A gear shifting mechanism for a motor vehicle having a longitudinally and transversely shiftable transmission, comprising a power device for effecting the longitudinal shifting of said transmission, a power device connected for effecting the transverse shifting of said transmission, control mechanism connected to control the operation of said power devices, and auxiliary control means comprising a valve device having a single movable member which is actuated by said second named power device for rendering said control mechanism ineffective for controlling said first named power device under predetermined conditions.

6. A gear shifting mechanism for a motor vehicle having a longitudinally and transversely shiftable transmission, comprising a power device connected for effecting the longitudinal shifting of said transmission, a power device connected for effecting the transverse shifting of said transmission, control mechanism connected to control the operation of said power devices including a manual selector, and an auxiliary control valve device having a single movable member which is actuated by said second named power device for rendering said manual selector ineffective for controlling said first named power device under predetermined conditions.

7. A gear shifting mechanism for a motor vehicle having a longitudinally and transversely shiftable transmission, comprising a differential pressure power device connected for effecting the longitudinal shifting of said transmission, a differential pressure power device connected for effecting the transverse shifting of said transmission, control valve mechanism connected to control the operation of said power devices, and an auxiliary control valve device having a single movable member which is actuated by said second named power device for rendering a portion of said control valve mechanism ineffective for controlling said first named power device under predetermined conditions.

8. A gear shifting mechanism for a motor vehicle having a longitudinally and transversely shiftable transmission, comprising a differential pressure power device connected for effecting the longitudinal shifting of said transmission, a differential pressure power device connected for effecting the transverse shifting of said transmission, control valve mechanism connected to control the operation of said power devices including a manual selector valve device, and an auxiliary control valve device having a single movable member which is actuated by said second named power device for rendering said selector valve device ineffective for controlling said first named power device under predetermined conditions.

9. A gear shifting mechanism for a motor vehicle having a transmission including means for shifting it into a plurality of gear positions, power means connected for moving said shifting means, control mechanism connected to control the operation of said power means, and auxiliary control means including a valve device having a single movable member which is actuated by said power means and operative when said shifting means moves out of a gear position for rendering said power means inoperative for returning said shifting means to such gear position unless predetermined by said control mechanism.

10. A gear shifting mechanism for a motor vehicle having a transmission including means for shifting it into a plurality of gear positions, differential pressure power means connected for moving said shifting means, control valve mechanism connected to control the operation of said power means, and an auxiliary control valve device having a single movable member which is actuated by said power means and operative when said shifting means moves out of a gear position for rendering said power means inoperative for returning said shifting means to such gear position unless predetermined by said control valve mechanism.

11. A gear shifting mechanism for a motor vehicle having a transmission including means for shifting it into a plurality of positions, power means connected for moving said shifting means, control mechanism connected to control the operation of said power means including a manual selector, and auxiliary control means including a valve device having a single movable member which is actuated by said power means and operative when said shifting means moves out of a gear position for rendering said power means inoperative for returning said shifting means to such gear position unless predetermined by said manual selector.

12. A gear shifting mechanism for a motor vehicle having a transmission including means for shifting it into a plurality of gear positions, differential pressure power means connected for moving said shifting means, control valve mechanism connected to control the operation of said power means including a selector valve device, and an auxiliary control valve device having a single movable member which is actuated by said power means and operative when said shifting means moves out of a gear position for rendering said power means inoperative for returning said shifting means to such gear position unless predetermined by said selector valve device.

13. A gear shifting mechanism for a motor vehicle having a transmission including means for shifting it between two gear positions by the movement of parts of the transmission in a plurality of planes, power means connected for moving said shifting means, control mechanism connected to control the operation of said power means, and auxiliary control means including a valve device having a single movable member which is actuated by said power means and operative when said control mechanism predetermines the movement of said shifting means from one of said positions to the other position for preventing said power means from tending to move said shifting means to said last named position until said shifting means is in condition to be moved to such position.

14. A gear shifting mechanism for a motor vehicle having a transmission including means for shifting it between two gear positions by movement of parts of the transmission in a plurality of planes, power means connected for moving said shifting means, control mechanism connected to control the operation of said power means including a manual selector, and auxiliary control means including a valve device having a single movable member which is actuated by said power means and operative when said manual selector predetermines the movement of said shifting means from one of said positions to the other position for preventing said power means from tending to move said shifting means to said last named position until said shifting means is in condition to be moved to such position.

15. A gear shifting mechanism for a motor vehicle having a transmission including means for shifting it between two gear positions by movement of parts of the transmission in a plurality of planes, differential pressure power means connected for moving said shifting means, control valve mechanism connected to control the operation of said power means, and an auxiliary valve device having a single movable member which is actuated by said power means and operative when said control valve mechanism predetermines the movement of said shifting means from one of said positions to the other position for preventing said power means from tending to move said shifting means to said last named position until said shifting means is in condition to be moved to such position.

16. A gear shifting mechanism for a motor vehicle having a transmission including means for shifting it between two gear positions by movement of parts of the transmission in a plurality of planes, differential pressure power means connected for moving said shifting means, control valve mechanism connected to control the operation of said power means including a selector valve device, and an auxiliary control valve device having a single movable member which is actuated by said power means and operative when said selector valve device predetermines the movement of said shifting means from one of said positions to the other position for preventing said power means from tending to move said shifting means to said last named position until said shifting means is in condition to be moved to such position.

17. A gear shifting mechanism for a motor vehicle having a transmission provided with shifting means including a pair of shift rods each movable longitudinally into two gear positions and means for transferring the gear shifting movement between said rods, comprising power means connected to operate said shifting means, and control mechanism connected to control the operation of said power means including a valve device having a single movable member which is actuated by said power means and operative for insuring the transferring of the gear shifting movement from one shift rod to the other when said control mechanism predetermines a shift between two gear positions represented by movement of the respective shift rods in the same direction.

18. A gear shifting mechanism for a motor vehicle having a transmission provided with longitudinally and transversely shiftable means, power mechanism connected for longitudinally shifting said means, power mechanism connected for transversely shifting said means, and control means actuated by said second named power mechanism in advance of the transmission of transverse shifting movement to said shiftable means for controlling said first named power mechanism.

19. A gear shifting mechanism for a motor vehicle having a transmission provided with longitudinally and transversely shiftable means, power mechanism connected for longitudinally shifting said means, power mechanism connected for transversely shifting said means, control mechanism connected to control the operation of said power mechanisms, and means operative by said second named power mechanism in advance of the transmission of transverse shifting movement to said shiftable means for rendering said control mechanism ineffective for controlling said first named power mechanism.

20. A gear shifting mechanism for a motor vehicle having a transmission provided with longitudinally and transversely shiftable means, power mechanism connected for longitudinally shifting said means, power mechanism connected for transversely shifting said means, means including a lost motion connection for transmitting movement between said second named power mechanism and said shiftable means, and means operative by said lost motion connection for controlling said first named power mechanism upon actuation of said second named power mechanism.

21. A gear shifting mechanism for a motor vehicle having a transmission provided with longitudinally and transversely shiftable means, power mechanism connected for longitudinally shifting said means, power mechanism connected for transversely shifting said means, means including a lost motion connection for transmitting movement between said second named power mechanism and said shiftable means, control mechanism connected to control the operation of said power mechanisms, and means operative by said lost motion connection upon actuation of said second named power mechanism for rendering said control mechanism ineffective for controlling said first named power mechanism.

22. A gear shifting mechanism for a motor vehicle having a transmission provided with longitudinally and transversely shiftable means, power mechanism connected for longitudinally shifting said means, power mechanism connected for transversely shifting said means, means including a lost motion connection for transmitting movement between said second named power mechanism and said shiftable means, and a control valve operative by said lost motion connection upon initial actuation of said second named power mechanism for controlling said first named power mechanism.

23. A gear shifting mechanism for a motor vehicle having a transmission provided with longitudinally and transversely shiftable means, power mechanism connected for longitudinally shifting said means, power mechanism connected for transversely shifting said means, control mechanism connected to control the operation of said power mechanisms, means including a lost motion connection for transmitting movement between said second named power mechanism and said shiftable means, and a control valve operable by said lost motion connection upon initial actuation of said second named power mechanism for rendering said control mechanism ineffective for controlling said first named power mechanism.

24. A gear shifting mechanism for a motor vehicle having a transmission provided with longitudinally and transversely shiftable means, power mechanism connected for longitudinally shifting said means, power mechanism connected for transversely shifting said means, means including a lost motion connection for transmitting movement between said second named power mechanism and said shiftable means, said lost motion connection comprising a lever having free movement upon initial actuation of said second named power mechanism, and means operative upon free movement of said lever for controlling said first named power mechanism.

25. A gear shifting mechanism for a motor vehicle having a transmission provided with longitudinally and transversely shiftable means, power mechanism connected for longitudinally shifting said means, power mechanism connected for transversely shifting said means, means including a lost motion connection for transmitting movement between said second named power mechanism and said shiftable means, said lost motion connection comprising a lever having free movement upon initial actuation of said second named power mechanism, control mechanism connected to control the operation of said power mechanisms, and means operative upon free movement of said lever for rendering said control mechanism ineffective for controlling said first named power mechanism.

26. A gear shifting mechanism for a motor vehicle having a transmission provided with longitudinally and transversely shiftable means, power mechanism connected for longitudinally shifting said means, power mechanism connected for transversely shifting said means, means including a lost motion connection for transmitting movement between said second named power mechanism and said shiftable means, said lost motion connection comprising a lever having free movement upon initial actuation of said second named power mechanism, and a control valve operable upon free movement of said lever for controlling said first named power mechanism.

27. A gear shifting mechanism for a motor vehicle having a transmission provided with longitudinally and transversely shiftable means, power mechanism connected for longitudinally shifting said means, power mechanism connected for transversely shifting said means, means including a lost motion connection for transmitting movement between said second named power mechanism and said shiftable means, said lost motion connection comprising a lever having free movement upon initial actuation of said second named power mechanism, control mechanism connected to control the operation of said power mechanisms, and a control valve operable upon free movement of said lever for rendering said control mechanism ineffective for controlling said first named power mechanism.

28. A gear shifting mechanism for a motor vehicle having a transmission provided with longitudinally and transversely shiftable means, power mechanism for longitudinally shifting said means, a second power mechanism, a pair of levers connected respectively to said second power mechanism and said shiftable means for transversely shifting said means, said levers having lost motion connection therebetween, and means operative by the lever connected to said second power mechanism for controlling said first named power mechanism.

29. A gear shifting mechanism for a motor vehicle having a transmission provided with longitudinally and transversely shiftable means, power mechanism for longitudinally shifting said means, a second power mechanism, a pair of levers connected respectively to said second power mechanism and said shiftable means for transversely shifting said means, said levers having lost motion connection therebetween, control mechanism for said power mechanisms, and means operative upon movement of the lever connected to said second named power mechanism for rendering said control mechanism ineffective for controlling said first named power mechanism.

30. A gear shifting mechanism for a motor vehicle having a shiftable member movable transversely and longitudinally to provide different gear ratios, power mechanism connected to move said shiftable member longitudinally, power mechanism connected to move said shiftable member transversely, means connected to transmit movement from said second named power mechanism to said shiftable member, said last named means comprising a lever having one end connected to move said shiftable member, a second lever pivotally connected to the first named lever between the pivot and the other end thereof, the pivotal connection between said levers providing lost motion therebetween whereby said second lever is freely movable within fixed limits without transmitting movement to the first named lever, said second named power mechanism being connected to one end of said second lever, control mechanism connected to control the operation of said power mechanisms, and an auxiliary control mechanism connected to the second named lever to be operated during free movement thereof for rendering said control mechanism ineffective for controlling said first named power mechanism.

31. A gear shifting mechanism for a motor vehicle having a transmission provided with a shiftable member movable transversely and longitudinally to provide different gear ratios, a differential pressure operated motor connected to move said shiftable member longitudinally, a differential pressure operated motor for moving said shiftable member transversely, motion transmitting connections between said second named motor and said shiftable member, said connections comprising a bell crank lever having one end connected to move said shiftable member transversely, a second lever having lost motion pivotal connection intermediate its ends with said bell crank lever between the pivot and the other end thereof, said second named motor being connected to one end of said second lever, control valve mechanism connected to control said motors, manual means connected to control said control valve mechanism, and an auxiliary control valve connected to the other end of said second named lever to render said manual means ineffective for controlling said first named motor.

HENRY W. HEY.